US008375083B2

(12) United States Patent
Lu et al.

(10) Patent No.: US 8,375,083 B2
(45) Date of Patent: Feb. 12, 2013

(54) NAME RESOLUTION IN EMAIL

(75) Inventors: Fang Lu, Billerica, MA (US); Elaine I. Kuo, North Chelmsford, MA (US); Corey S. McCaffrey, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 11/967,902

(22) Filed: Dec. 31, 2007

(65) Prior Publication Data
US 2009/0172115 A1 Jul. 2, 2009

(51) Int. Cl.
G06G 15/16 (2006.01)
G06F 15/16 (2006.01)

(52) U.S. Cl. .................. 709/204; 709/205; 709/206

(58) Field of Classification Search .......... 709/204, 709/205, 206
See application file for complete search history.

(56) References Cited

U.S. PATENT DOCUMENTS

| 6,993,563 | B2* | 1/2006 | Lytle et al. | 709/206 |
|---|---|---|---|---|
| 2002/0072917 | A1* | 6/2002 | Irvin et al. | 704/270.1 |
| 2002/0181466 | A1* | 12/2002 | Neustein et al. | 370/393 |
| 2002/0188683 | A1* | 12/2002 | Lytle et al. | 709/206 |
| 2003/0120737 | A1* | 6/2003 | Lytle et al. | 709/206 |
| 2003/0236842 | A1* | 12/2003 | Natarajan et al. | 709/206 |
| 2004/0122822 | A1* | 6/2004 | Thompson et al. | 707/100 |
| 2004/0210844 | A1* | 10/2004 | Pettinati et al. | 715/708 |
| 2004/0215726 | A1* | 10/2004 | Arning et al. | 709/206 |
| 2004/0260543 | A1* | 12/2004 | Horowitz et al. | 704/221 |
| 2005/0049997 | A1* | 3/2005 | Shipp | 707/1 |
| 2005/0283503 | A1* | 12/2005 | Hancock et al. | 707/200 |
| 2006/0168067 | A1* | 7/2006 | Carlson et al. | 709/206 |
| 2006/0184481 | A1* | 8/2006 | Zhang et al. | 706/45 |
| 2007/0043562 | A1* | 2/2007 | Holsinger et al. | 704/231 |
| 2007/0136429 | A1* | 6/2007 | Fine et al. | 709/206 |
| 2008/0059172 | A1* | 3/2008 | Bocking | 704/235 |
| 2008/0168026 | A1* | 7/2008 | Patil et al. | 707/2 |
| 2008/0168347 | A1* | 7/2008 | Hallyn | 715/700 |
| 2009/0055747 | A1* | 2/2009 | Cheah | 715/733 |
| 2009/0063962 | A1* | 3/2009 | Rubanovich et al. | 715/261 |
| 2009/0133110 | A1* | 5/2009 | Kumar et al. | 726/8 |
| 2009/0228452 | A1* | 9/2009 | Zhang et al. | 707/3 |
| 2009/0265376 | A1* | 10/2009 | Hamdy et al. | 707/102 |

* cited by examiner

*Primary Examiner* — Karen Tang
(74) *Attorney, Agent, or Firm* — DeLizio Gilliam, PLLC

(57) ABSTRACT

An email recipient input name is received. It is determined if the email recipient input name is ambiguous. If the email recipient input name is ambiguous, one or more employee attributes of a plurality of possible intended email recipients are compared with one or more employee attributes of an email sender to determine a probable intended email recipient.

20 Claims, 4 Drawing Sheets

NAME RESOLUTION IN EMAIL

FIELD OF DISCLOSURE

This disclosure generally relates to name resolution in collaborative applications, and more particularly relates to name resolution using social networks.

BACKGROUND

Sometimes people in large organizations have similar names and email aliases. These people may work in different locations and/or divisions, so the only feature that may distinguish one user from another could be the domain name in their canonical name. For example, John Doe/Fairfax and John Doe/China are only distinguished by their domain names: China or Fairfax. This becomes a problem when a user relies on the email program to automatically resolve the address in the "TO" field because it may resolve to the incorrect email recipient. A dialog-based pop-up to challenge the user's decision does not entirely solve this problem, as a quick gesture can nullify such defensive mechanism (such as quickly pressing the Enter key without really reading the dialog, an occurrence that happens quite often). The result of this can be a relatively minor annoyance, but it may also be very critical. For example, confidential information may be sent to the wrong person within the same organization. A similar severe result may be time sensitive messages being sent to the wrong person and a deadline is missed.

SUMMARY

According to a first implementation a method includes receiving an email recipient input name. It is determined if the email recipient input name is ambiguous. If the email recipient input name is ambiguous, one or more employee attributes of a plurality of possible intended email recipients are compared with one or more employee attributes of an email sender to determine a probable intended email recipient.

One or more of the following features may be included. The email recipient input name may include one or more of a to recipient of an email, a carbon copy recipient of an email, and a blind carbon copy recipient of an email. Determining if the email recipient input name is ambiguous may include determining if the email recipient input name corresponds to more than one possible email recipient in a directory.

Comparing one or more employee attributes of one or more possible intended email recipients with one or more employee attributes of an email sender may include accessing a directory including the one or more employee attributes, and determining if at least a portion of the one or more employee attributes of at least one of the plurality of possible intended email recipients matches at least a portion of the one or more employee attributes of the email sender. The one or more employee attributes may include a geographic location of the one or more possible email recipients. The one or more employee attributes may include a job title of the one or more possible email recipients. The one or more employee attributes may include a department of the one or more possible email recipients.

The one or more possible intended email recipients may be prioritized based upon, at least in part, a correlation between at least one of the one or more employee attributes of at least one of the plurality of possible intended email recipients and at least one of the one or more employee attributes of the email sender. If a correlation exists between the one or more employee attributes of at least two of the plurality of possible intended email recipients and the one or more employee attributes of the email sender, the at least two of the plurality of possible intended email recipients may be prioritized based upon, at least in part, a correlation between at least a second of the one or more employee attributes of the at least two of the plurality of possible intended email recipients and at least a second of the one or more employee attributes of the email sender. A listing including the prioritized plurality of possible intended email recipients may be provided.

According to another implementation a computer program product resides on a computer readable medium having a plurality of instructions stored on it. When executed by a processor, the instructions cause the processor to perform operations including receiving an email recipient input name. It is determined if the email recipient input name is ambiguous. If the email recipient input name is ambiguous, one or more employee attributes of a plurality of possible intended email recipients are compared with one or more employee attributes of an email sender to determine a probable intended email recipient.

One or more of the following features may be included. The email recipient input name may include one or more of a to recipient of an email, a carbon copy recipient of an email, and a blind carbon copy recipient of an email. The instructions for determining if the email recipient input name is ambiguous may include instructions for determining if the email recipient input name corresponds to more than one possible email recipient in a directory.

The instructions for comparing one or more employee attributes of one or more possible intended email recipients with one or more employee attributes of an email sender may include instructions for accessing a directory including the one or more employee attributes, and may include instructions for determining if at least a portion of the one or more employee attributes of at least one of the plurality of possible intended email recipients matches at least a portion of the one or more employee attributes of the email sender. The one or more employee attributes may include a geographic location of the one or more possible email recipients. The one or more employee attributes may include a job title of the one or more possible email recipients. The one or more employee attributes may include a department of the one or more possible email recipients.

Instructions may be included for prioritizing the one or more possible intended email recipients based upon, at least in part, a correlation between at least one of the one or more employee attributes of at least one of the plurality of possible intended email recipients and at least one of the one or more employee attributes of the email sender. If a correlation exists between the one or more employee attributes of at least two of the plurality of possible intended email recipients and the one or more employee attributes of the email sender, instructions may further be included for prioritizing the at least two of the plurality of possible intended email recipients based upon, at least in part, a correlation between at least a second of the one or more employee attributes of the at least two of the plurality of possible intended email recipients and at least a second of the one or more employee attributes of the email sender. Instructions may be included for providing a listing including the prioritized plurality of possible intended email recipients.

The details of one or more implementations are set forth in the accompanying drawings and the description below. Other features and advantages will become apparent from the description, the drawings, and the claims.

DETAILED DESCRIPTION OF PREFERRED EMBODIMENTS

Figure 1:
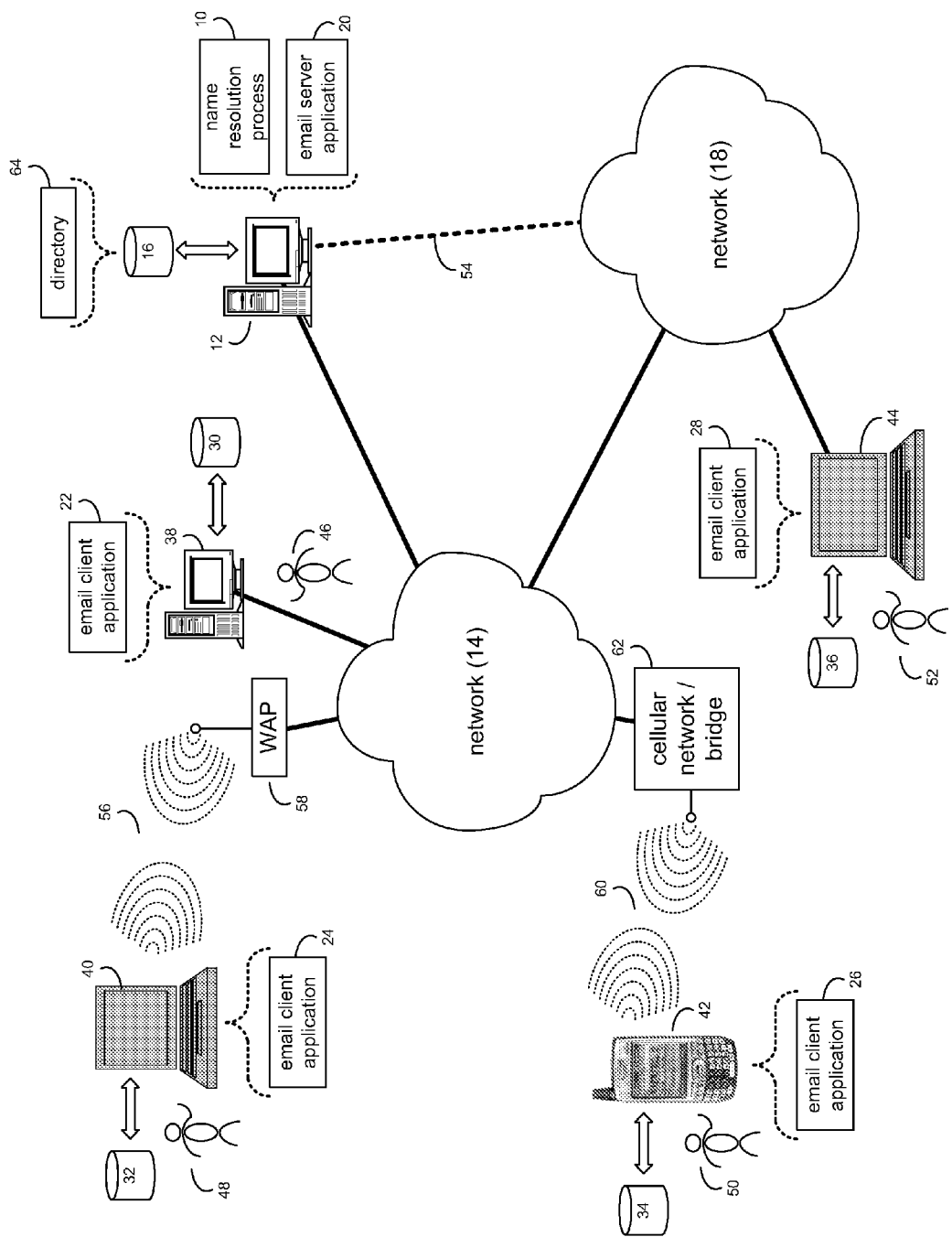
FIG. 1 is a diagrammatic view of a name resolution process and an email application coupled to a distributed computing network.

System Overview:

Referring to FIG. 1, there is shown name resolution process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™m; Novell Netware™; or Redhat Linux™, for example. Alternatively, name resolution process 10 may reside on and be executed, in whole or in part, by a client electronic device, such as a personal computer, notebook computer, personal digital assistant, or the like.

As will be discussed below in greater detail, name resolution process 10 may receive an email recipient input name, and may determine if the email recipient input name is ambiguous. If the email recipient input name is ambiguous, name resolution process 10 may compare one or more employee attributes of a plurality of possible intended email recipients with one or more employee attributes of an email sender to determine a probable intended email recipient.

The instruction sets and subroutines of name resolution process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID (Redundant Arrays of Independent Disks) array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute an email server application, e.g., email server application 20, examples of which may include, but are not limited to, e.g., Lotus Domino™ Server and Microsoft Exchange™ Server. Email server application 20 may be a mail transfer agent that may store and route email to one or more email client applications (e.g., email client applications 22, 24, 26, 28), examples of which may include but are not limited to Lotus Notes™ and Microsoft Outlook™ Name resolution process 10 may be a stand alone application that interfaces with email server application 20 or may be an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the name resolution process may be a client-side application (not shown) residing on one or more storage devices (e.g., stored on storage devices 30, 32, 34, 36) coupled to one or more client electronic devices (e.g., client electronic devices 38, 40, 42, 44, respectively). As such, the name resolution process may be a stand alone application that interfaces with an email client application (e.g., email client applications 22, 24, 26, 28), or may be an applet/application that is executed within an email client application (e.g., email client applications 22, 24, 26, 28). As such, the name resolution process may be a client-side process, a server-based process, or a hybrid client-side/server-based process, which may be executed, in whole or in part, by server computer 12, or one or more of client electronic devices 38, 40, 42, 44.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may, for example, create, send, receive, and/or manage email communications.

Users 46, 48, 50, 52 may access email server application 20 directly through the device on which the client applications (e.g., email client applications 22, 24, 26, 28) is executed, namely client electronic devices 38, 40, 42, 44, for example. Users 46, 48, 50, 52 may access email server application 20 directly through network 14 or through secondary network 18. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/ bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Name Resolution Process

For the following discussion email client application 22 is going to be described for illustrative purposes. However, this is not to be construed as a limitation of the disclosure as other email client applications (e.g., email client applications 24, 26, 28) may be equally utilized.

Figure 2:
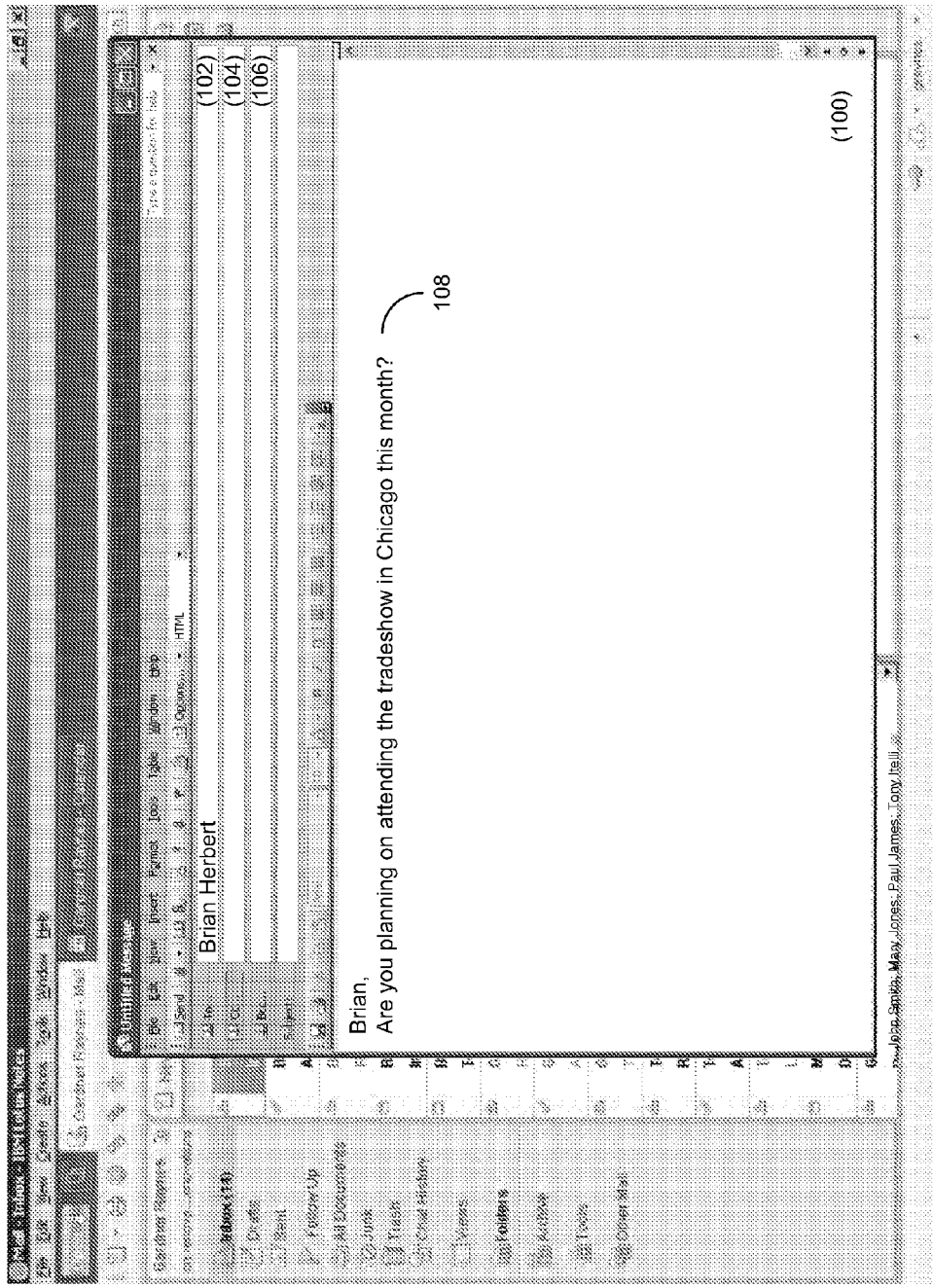
FIG. 2 is a display screen rendered by the name resolution process and/or the email application of FIG. 1

Referring also to FIG. 2, email client application 22 (alone or in conbination with name resolution process 10 and/or email server application 20) may alow a user (e.g., user 46) to generate email message 100 that may be addressed to "TO" recipients 102, "CC" (i.e., carbon copy) recipients 104, and "BCC" (i.e., blind carbon copy) recipients 106. Further, and is known in the art, email messge 100 may include message content 108 (i.e., the body of the email message).

Figure 3:
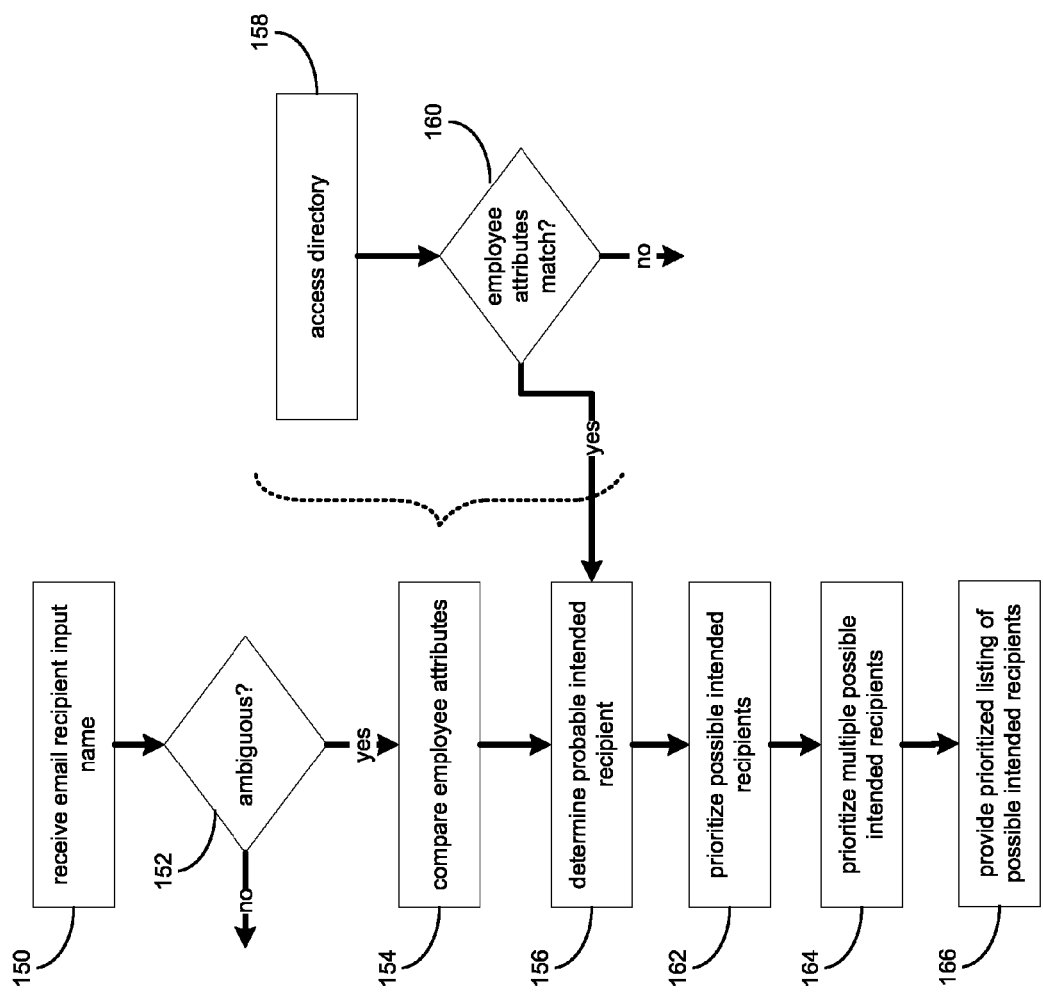
FIG. 3 is a flowchart of a process executed by the name resolution process of FIG. 1.

Referring also to FIG. 3, name resolution process 10 may receive 150 the email recipient input name. Name resolution process 10 may futher determine 152 if the email recipient input name is ambiguous. If the email recipient input name is ambiguous, name resolution process 10 may compare 154 one or more employee attributes of a plurality of possible intended email recipients with one or more employee attributes of the email sender to determine 156 a probable intended email recipient.

Continuing with the above stated example, user 46 may input (e.g., using a keyboard; not shown), an email recipient input name (e.g., "Brian Herber") as "TO" recipient 102. While not shown, user 46 may similarly input one or more additional email recipient input names as other "TO" recipients 102, as "CC" recipients 104 and/or as "BCC" recipients 106. Name resolution process 10 may receive 150 the email recipient input name (i.e., "Brian Herbert"), for example, when user 46 selects a different field of email message 100 (e.g., "CC" recipient 104 field, "BCC" recipient 106, message content 108 pane, or the like). In various other embodiments, name resolution process 10 may recieve 150 the email recipient input name, e.g., when email message 100 is sent, or the like.

Determining 152 if the email recipient input name is ambiguous may include determining if the email recipient input name corresponds to more than one possible email recipient in a directory. For example, name resolution process 10 may look-up the email recipient input name (i.e., "Brian Herbert) in a directory to determine an email address corresponding to the email recipient input name. The directory (e.g., directory 64, which may reside on server computer 12, for example) may include a directory of email users. For example, directory 64 may be a company directory, e.g., which may include the names and the email addresses of all of the employees of the company. If directory 64 includes only one possible email recipient corresponding to the email recipient input name, no ambiguity exists as to the intended email recipient of email message 100.

Continuing with the above-stated example, rather than including only a single possible recipient, directory 64 may include a plurality of possible intended email recipients corresponding to the email recipient input name "Brian Herbert". For example, directory 64 may include listings for four possible Brian Herberts. Accordingly, the email recipient input name may be ambiguous as the email recipient input name "Brian Herbert" may refer to any one of the four Brian Herberts included in directory 64.

Name resolution process 10 may compare 154 one or more employee attributes of the four Brian Herberts included in directory 64 with one or more employee attributes of user 46 (i.e., the email sender). The one or more employee attributes may include, for example, a geographic location, a job title, and a division of the one or more employee attributes. A geographic location of the possible intended email recipients (e.g., the four Brian Herberts included in directory 64) may include, for example, the country, state and/or city in which each of the possible intended email recipients works. A job title may include a title, such as manager of human resources, quality control technician, or the like, and/or may include a rank or pay grade. A division may include, for example, a department, corporate division, branch, or the like, of a company.

Comparing 154 one or more employee attributes of the one or more possible intended email recipients with one or more employee attributes of an email sender may include accessing 158 a directory including the one or more employee attributes. The directory may include, for example, a corporate directory including a listing of all of the employees, employee contact information, employee job description and the like. According to one embodiment, directory 64 may include the one or more employee attributes, in addition to employee email addresses.

Continuing with the above-stated example, based upon information in directory 64, the first Brian Herbert ("Brian 1") may be a Market Analyst in Company X's Product Development Division in Beijing, China. The second Brian Herbert ("Brian 2") may be a Software Engineer in Company X's Software Group in Dublin, Ireland. The third Brian Herbert ("Brian 3") may be a Customer Service Representative in Company X's Integrated Supply Chain division in San Francisco, Calif., USA. The fourth Brian Herbert ("Brian 4") may be a Software Engineer in Company X's Software Group in Fairfax, Va., USA. User 46 may be a Software Engineer in Company X's Software Group in Cambridge, Mass., USA.

Name resolution process 10 may determine 160 if at least a portion of the one or more employee attributes of at least one of the plurality of possible intended email recipients matches at least a portion of the one or more employee attributes of the email sender. Continuing with the above-stated example, name resolution process 10 may determine 160 that at least a portion of the one or more employee attributes of "Brian 2" match at least a portion of the one or more employee attributes of user 46 (e.g., both are Software Engineers in Company X's Software Group). Similarly, name resolution process 10 may determine 160 that at least a portion of the one or more employee attributes of "Brian 3" match at least a portion of the one or more employee attributes of user 46 (e.g., both are located in the USA). Further, name resolution process 10 may determine 160 that at least a portion of the one or more employee attributes of "Brian 4" match at least a portion of the one or more employee attributes of user 46 (e.g., both are Software Engineers in Company X's Software Group and are located in the USA). Based upon, at least in part, the comparison 154 of the one or more employee attributes of the plurality of Brian Herberts with the one or more employee attributes of user 46, name resolution process 10 may determine 156 that "Brian 2", "Brian 3", and "Brian 4" may be probable intended email recipients Name resolution process 10 may prioritize 162 the one or more possible intended email recipients based upon, at least in part, a correlation between at least one of the one or more employee attributes of at least one of the plurality of possible intended email recipients and at least one of the one or more employee attributes of the email sender. Further, if a correlation exists between the one or more employee attributes of at least two of the plurality of possible intended email recipients and the one or more employee attributes of the email sender, name resolution process 10 may prioritize 164 the at least two of the plurality of possible intended email recipients based upon, at least in part, a correlation between at least a second of the one or more employee attributes of the at least two of the plurality of possible intended email recipients and at least a second of the one or more employee attributes of the email sender.

For example, name resolution process 10 prioritize 162 each of "Brian 2", "Brian 3", and "Brian 4" as more probable intended email recipients than "Brian 1" based upon, at least in part, a correlation between at least on of the one or more employee attributes of "Brian 2", "Brian 3", and "Brian 4" with at least one of the employee attributes of user 46. Further, name resolution process 10 may prioritize 164 "Brian 4" as the most probable intended email recipient, e.g., based on the greatest number of matches (e.g., geographic location, job title, and division) of employee attributes of "Brian 4" with the employee attributes of user 46. Name resolution process 10 may prioritize "Brian 2" as the next most probable intended email recipient based upon, at least in part, the next greatest number of matches (e.g., job title and company division). Correspondingly, name resolution process 10 may prioritize 162 "Brian 1" as a least probable intended email recipient based upon, at least in part, no matches of employee attributes of "Brian 1" with the employee attributes of user 46.

For illustrative purposes, in the above-discussion each of the one or more employee attributes has been treated equally for the purposes of prioritizing 162, 164 the plurality of possible intended email recipients. However, this should not be construed as a limitation of this disclosure, as various ones of the one or more employee attributes may be weighted more heavily for the purpose of prioritizing 162, 164 the plurality of possible intended email recipients, depending upon design criteria and user preference.

Figure 4:
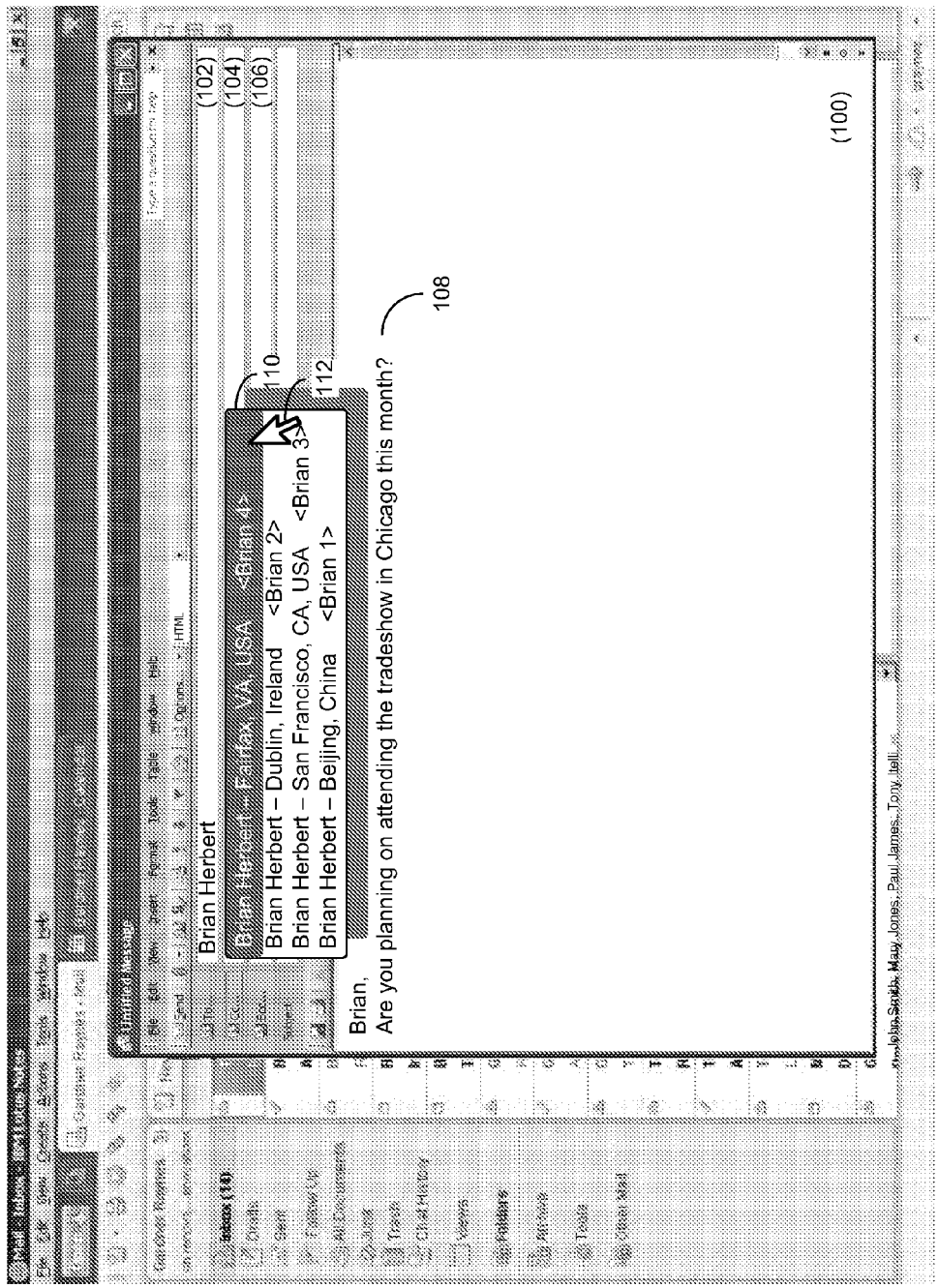
FIG. 4 is a display screen rendered by the name resolution process and/or the email application of FIG. 1.

Name resolution process 10 may provide a listing including the prioritized plurality of possible intended email recipients. For example, and referring also to FIG. 4, name resolution process 10 (alone or in combination with email client application 22 and/or email server application 20) may render name resolution pop-up 110, including a prioritized listing of the plurality of possible intended email recipients (i.e., "Brian 4", "Brian 2", "Brian 3", and "Brian 4"). The possible intended email recipient determined 156 to be the probable intended email recipient (i.e., "Brian 4") is included as the first item of the prioritized listing included within name resolution pop-up 110. It will be appreciated that an un-prioritized listing of the plurality of possible intended email recipients may display the possible intended email recipients in a different order (e.g., alphabetically by geographic location, resulting in a listing in descending order of "Brian 1" in China, "Brian 2" in Ireland, "Brian 3" in California, USA, and "Brian 4" in Virginia, USA).

Name resolution process 10 (alone or in combination with one or more of email client application 22 and/or email server application 20) may allow user 46 to select, e.g., via onscreen pointer 112 controlled by a pointing device (such as a mouse; not shown) a desired one of the plurality of possible intended email recipients from the prioritized listing included within name resolution pop-up 110. As the listing of possible intended email recipients included within name resolution pop-up 110 are prioritized based upon probability of the possible intended email recipients being a desired email recipient, should user 46, for example, select the first name in the list (e.g., the name suggested in highlighting) in haste and/or without fully exploring the listing, the probability that the selected name will be the intended email recipient may be improved.

A number of implementations have been described. Nevertheless, it will be understood that various modifications may be made. Accordingly, other implementations are within the scope of the following claims.

What is claimed is:

1. A method comprising:
receiving an email recipient input name from an email sender as an input to an email client application to identify an intended email recipient;
determining if the email recipient input name is ambiguous;
if the email recipient input name is ambiguous, resolving the email recipient input name, wherein the resolving comprises,
comparing one or more employee attributes of a plurality of possible intended email recipients with one or more employee attributes of the email sender to identify a set of possible intended email recipients which have at least a portion of the one or more employee attributes which match at least a portion of the one or more employee attributes of the email sender,
prioritizing the set of possible intended email recipients based upon a correlation of one or more employee attributes of each of the set of possible intended email recipients with the one or more employee attributes of the email sender,
displaying the set of possible intended email recipients within a prioritized listing of possible intended email recipients to the email sender via the email client application, and
receiving an indication from the email sender to identify the intended email recipient in response to the displaying; and
addressing an email message in response to receiving the indication from the email sender to identify the intended email recipient.

2. The method of claim 1, wherein the email recipient input name includes one or more of a TO: recipient of an email, a carbon copy recipient of an email, and a blind carbon copy recipient of an email.

3. The method of claim 1, wherein determining if the email recipient input name is ambiguous includes determining if the email recipient input name corresponds to more than one possible email recipient in a directory.

4. The method of claim 1, wherein comparing one or more employee attributes of the plurality of possible intended email recipients with one or more employee attributes of the email sender comprises:

accessing a directory including the one or more employee attributes of the plurality of possible intended email recipients and the one or more employee attributes of the email sender; and including in the set of possible intended email recipients only those of the plurality of possible intended email recipients which have at least a portion of the one or more employee attributes which match at least a portion of the one or more employee attributes of the email sender.

5. The method of claim 1, wherein each of the one or more employee attributes of the plurality of possible intended email recipients and the one or more employee attributes of the email sender comprises a geographic location.

6. The method of claim 1, wherein each of the one or more employee attributes of the plurality of possible intended email recipients and the one or more employee attributes of the email sender comprises a job title.

7. The method of claim 1, wherein each of the one or more employee attributes of the plurality of possible intended email recipients and the one or more employee attributes of the email sender comprises a department.

8. The method of claim 1, wherein prioritizing the set of possible intended email recipients based upon a correlation of one or more employee attributes of each of the set of possible intended email recipients with the one or more employee attributes of the email sender comprises:
   determining a priority of each of the set of possible intended email recipients based upon a number of employee attributes for which a correlations exists between said each of the set of possible intended email recipients and the email sender.

9. The method of claim 8, wherein prioritizing the set of possible intended email recipients based upon a correlation of one or more employee attributes of each of the set of possible intended email recipients with one or more employee attributes of the email sender further comprises:
   defining weights corresponding to the one or more employee attributes of the email sender; and
   prioritizing the set of possible intended email recipients utilizing the weights.

10. The method of claim 1, wherein the resolving further comprises resolving the email recipient input name in response to receipt, via the email client application, of a request from the email sender to transmit the email message.

11. The computer program product of claim 1, wherein the resolving further comprises resolving the email recipient input name in response to receipt, via the email client application, of a request from the email sender to transmit the email message.

12. A computer program product residing on a non-transitory computer readable medium having a plurality of instructions stored thereon, which, when executed by a processor, cause the processor to perform operations comprising:
   receiving an email recipient input name from an email sender as an input to an email client application to identify an intended email recipient;
   determining if the email recipient input name is ambiguous;
   if the email recipient input name is ambiguous, resolving the email recipient input name, wherein the resolving comprises,
      comparing one or more employee attributes of a plurality of possible intended email recipients with one or more employee attributes of the email sender to identify a set of possible intended email recipients which have at least a portion of the one or more employee attributes which match at least a portion of the one or more employee attributes of the email sender,
   prioritizing the set of possible intended email recipients based upon a correlation of one or more employee attributes of each of the set of possible intended email recipients with the one or more employee attributes of the email sender,
   displaying the set of possible intended email recipients within a prioritized listing of possible intended email recipients to the email sender via the email client application, and
   receiving an indication from the email sender to identify the intended email recipient in response to the displaying; and
   addressing an email message in response to receiving the indication from the email sender to identify the intended email recipient.

13. The computer program product of claim 12, wherein the email recipient input name includes one or more of a TO: recipient of an email, a carbon copy recipient of an email, and a blind carbon copy recipient of an email.

14. The computer program product of claim 12, determining if the email recipient input name is ambiguous comprises determining if the email recipient input name corresponds to more than one possible email recipient in a directory.

15. The computer program product of claim 12, wherein comparing one or more employee attributes of the plurality of possible intended email recipients with one or more employee attributes of the email sender comprises:
   accessing a directory including the one or more employee attributes of the plurality of possible intended email recipients and the one or more employee attributes of the email sender; and
   including in the set of possible intended email recipients only those of the plurality of possible intended email recipients which have at least a portion of the one or more employee attributes which match at least a portion of the one or more employee attributes of the email sender.

16. The computer program product of claim 12, wherein each of the one or more employee attributes of the plurality of possible intended email recipients and the one or more employee attributes of the email sender comprises a geographic location.

17. The computer program product of claim 12, wherein each of the one or more employee attributes of the plurality of possible intended email recipients and the one or more employee attributes of the email sender comprises a job title.

18. The computer program product of claim 12, wherein each of the one or more employee attributes of the plurality of possible intended email recipients and the one or more employee attributes of the email sender comprises a department.

19. The computer program product of claim 12, wherein prioritizing the set of possible intended email recipients based upon a correlation of one or more employee attributes of each of the set of possible intended email recipients with the one or more employee attributes of the email sender comprises:
   determining a priority of each of the set of possible intended email recipients based upon a number of employee attributes for which a correlations exists between said each of the set of possible intended email recipients and the email sender.

20. The computer program product of claim 19, wherein prioritizing the set of possible intended email recipients based upon a correlation of one or more employee attributes of each of the set of possible intended email recipients with one or more employee attributes of the email sender further comprises:
defining weights corresponding to the one or more employee attributes of the email sender; and
prioritizing the set of possible intended email recipients utilizing the weights.

* * * * *